United States Patent
Chen

(10) Patent No.: US 7,443,053 B2
(45) Date of Patent: Oct. 28, 2008

(54) CONTROL CIRCUIT AND METHOD OF ELECTRIC OUTPUT MODES

(75) Inventor: Tsung-Chun Chen, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 302 days.

(21) Appl. No.: 10/944,392

(22) Filed: Sep. 20, 2004

(65) Prior Publication Data

US 2006/0061921 A1    Mar. 23, 2006

(51) Int. Cl.
*H02H 11/00* (2006.01)
*H02J 4/00* (2006.01)

(52) U.S. Cl. ............................ 307/44; 307/80; 307/85
(58) Field of Classification Search ............ 307/44
See application file for complete search history.

(56) References Cited

U.S. PATENT DOCUMENTS

| | | | | |
|---|---|---|---|---|
| 4,359,679 A * | 11/1982 | Regan | | 323/272 |
| 5,926,004 A * | 7/1999 | Henze | | 320/109 |
| 5,949,662 A * | 9/1999 | Boldin et al. | | 363/37 |
| 6,121,750 A * | 9/2000 | Hwa et al. | | 320/104 |
| 6,166,934 A * | 12/2000 | Kajouke et al. | | 363/65 |
| 6,191,500 B1 * | 2/2001 | Toy | | 307/64 |
| 6,268,711 B1 * | 7/2001 | Bearfield | | 320/117 |
| 6,445,086 B1 * | 9/2002 | Houston | | 307/24 |
| 6,552,447 B1 * | 4/2003 | Fuse | | 307/68 |
| 6,593,723 B1 * | 7/2003 | Johnson | | 320/113 |
| 6,614,133 B2 * | 9/2003 | Belson et al. | | 307/58 |
| 6,654,264 B2 * | 11/2003 | Rose | | 363/65 |
| 6,744,149 B1 * | 6/2004 | Karuppana et al. | | 307/31 |
| 7,239,045 B2 * | 7/2007 | Lathrop et al. | | 307/80 |
| 2003/0155813 A1 * | 8/2003 | Walter | | 307/31 |
| 2004/0160214 A1 * | 8/2004 | Blair et al. | | 320/118 |
| 2005/0035737 A1 * | 2/2005 | Elder et al. | | 320/103 |

* cited by examiner

Primary Examiner—Michael J Sherry
Assistant Examiner—Adi Amrany
(74) Attorney, Agent, or Firm—Muncy, Geissler, Olds, & Lowe PLLC

(57) ABSTRACT

A control circuit and control method of electric output modes for a stacked power supply system which has a circuit board to integrate a plurality of power supply devices to output electricity. The circuit board has a control circuit to actuate the power supply devices. The control circuit provides a parallel power supply mode and a backup power supply mode, and is connected to a switch device which provides a first signal source and a second signal source corresponding to the parallel power supply mode and the backup power supply mode to enable users to select an actuation signal output from the control circuit to determine the parallel power supply mode or backup power supply mode of the power supply devices.

2 Claims, 3 Drawing Sheets

CONTROL CIRCUIT AND METHOD OF ELECTRIC OUTPUT MODES

FIELD OF THE INVENTION

The present invention relates to a control circuit and method of electric output modes and particularly that for stacked power supply systems to enable users to switch to a selected electric output mode without producing two specifications of a parallel power supply mode and a backup power supply mode.

BACKGROUND OF THE INVENTION

With the video and audio multimedia technologies and Internet applications thriving tremendously, performances of hardware equipment (such as hard disk drives, card readers, optical disk burners, etc.) of personal computers and servers also are enhanced. However, the original power supply device usually aims to provide a fixed power capacity. In the event that the added new hardware equipment exceed the power capacity of the power supply device, users have to purchase a more powerful power supply device to provide enough electric power to meet operation requirement. For power supply device manufacturers, to fabricate a power supply device with a greater power capacity involves complicated techniques and more difficult fabrication processes. Not only fabrication cost is higher, the size and cooling also are technical bottlenecks difficult to overcome. Moreover, when in use, if all of the hardware equipment have not been fully utilized, waste of electric resource occurs.

The servers encounter another situation. As the computer has to be operated for a long period of time, if only a single large power supply device is used, in the event of malfunction or damage, the entire server has to be stopped for replacement. End users also have to stop operation.

In view of the aforesaid concerns, the higher capacity power supply device is more expensive and involves higher technical level, multi-layer power supply devices configured in a stacked or juxtaposed fashion have been developed. They may be divided into parallel power supply mode and backup power supply mode. The parallel power supply mode integrates a plurality of lower capacity power supply devices to become a higher capacity power supply system. The backup power supply mode can tolerate dysfunction or breakdown of one or more power supply devices. Hence they differ mainly in the total output power. For instance, integrating four power supply devices each having 100W capacity into a power supply system, the parallel power supply mode has total integrated power output of 400W, while the backup power supply mode may spare a portion of power (100W) and integrate and output the rest of power (300W).

Thus the parallel power supply mode can only be activated when all the power supply devices are in normal operating conditions to avoid overloading and ensure safety. Compared with the backup power supply mode, the parallel mode has an additional confirmation procedure. Hence the control circuit designs of the two modes are different. The present manufacturers have to develop and fabricate products according to two types of specifications. From user's standpoint, the server of some workstations needs the parallel mode power supply system to provide a greater power to meet loading requirements, while some servers require the backup mode power supply system that is adjustable according to different requirements. Both of them cannot be commonly shared. It creates a lot of troubles for users. To solve this problem, users often have to purchase a spared backup power supply system at an additional cost. Both look the same. Exchange and replacement take times and more efforts. It is not convenient.

SUMMARY OF THE INVENTION

The primary object of the present invention is to solve the aforesaid disadvantages. The present invention provides a stacked power supply system that simultaneously offers parallel power supply mode and backup power supply mode. It has a control circuit on a circuit board where a plurality of power supply devices are integrated to output electricity to actuate the power supply devices. The control circuit is connected to a switch device which provides a first signal source and a second signal source corresponding to the parallel power supply mode and the backup power supply mode to enable users to select an output actuation signal on the control circuit according to the first signal source or the second signal source to determine whether the power supply devices should be in the parallel power supply mode or the backup power supply mode.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
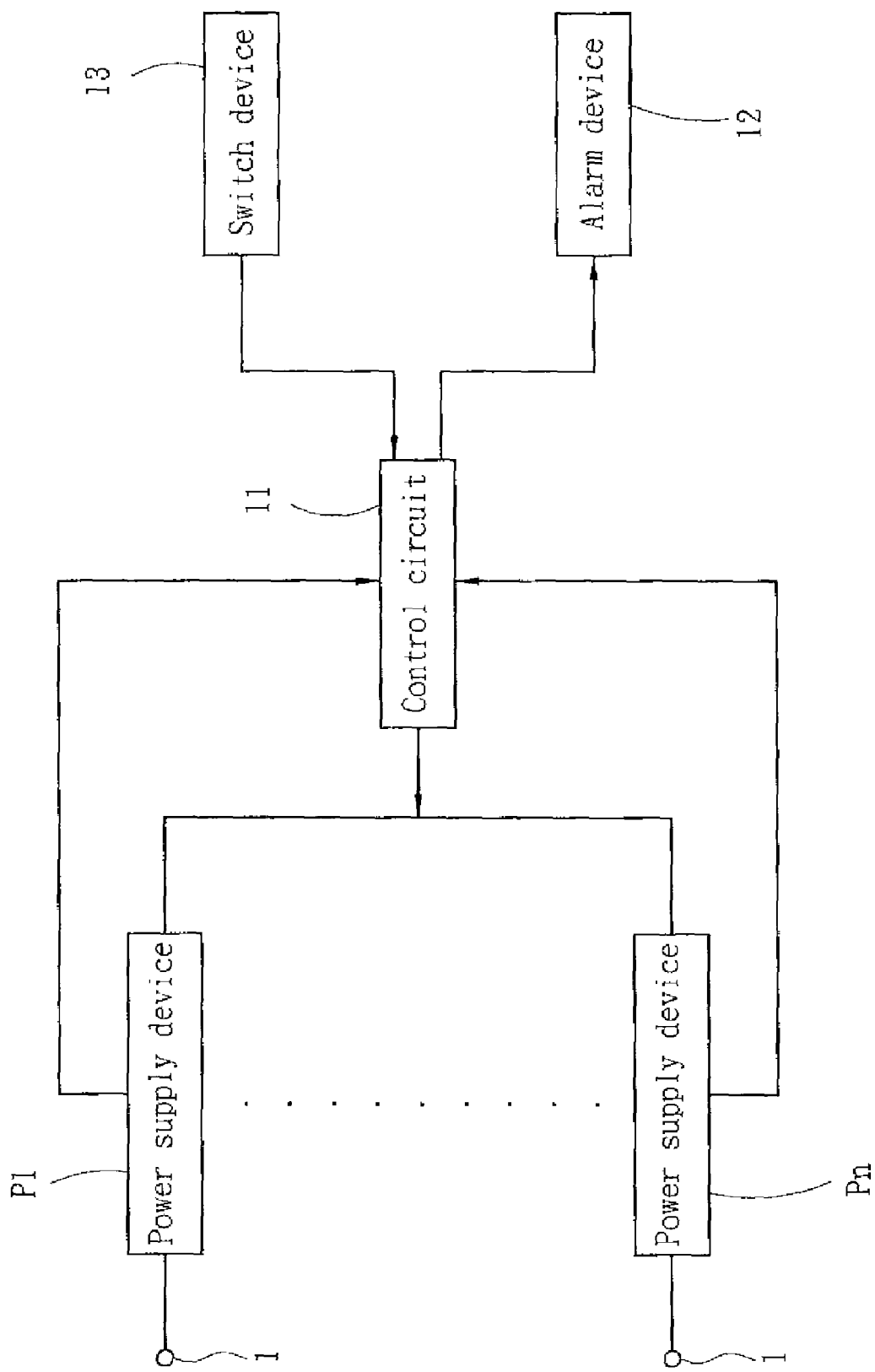
FIG. 1 is a circuit block diagram of the present invention.
Figure 2:
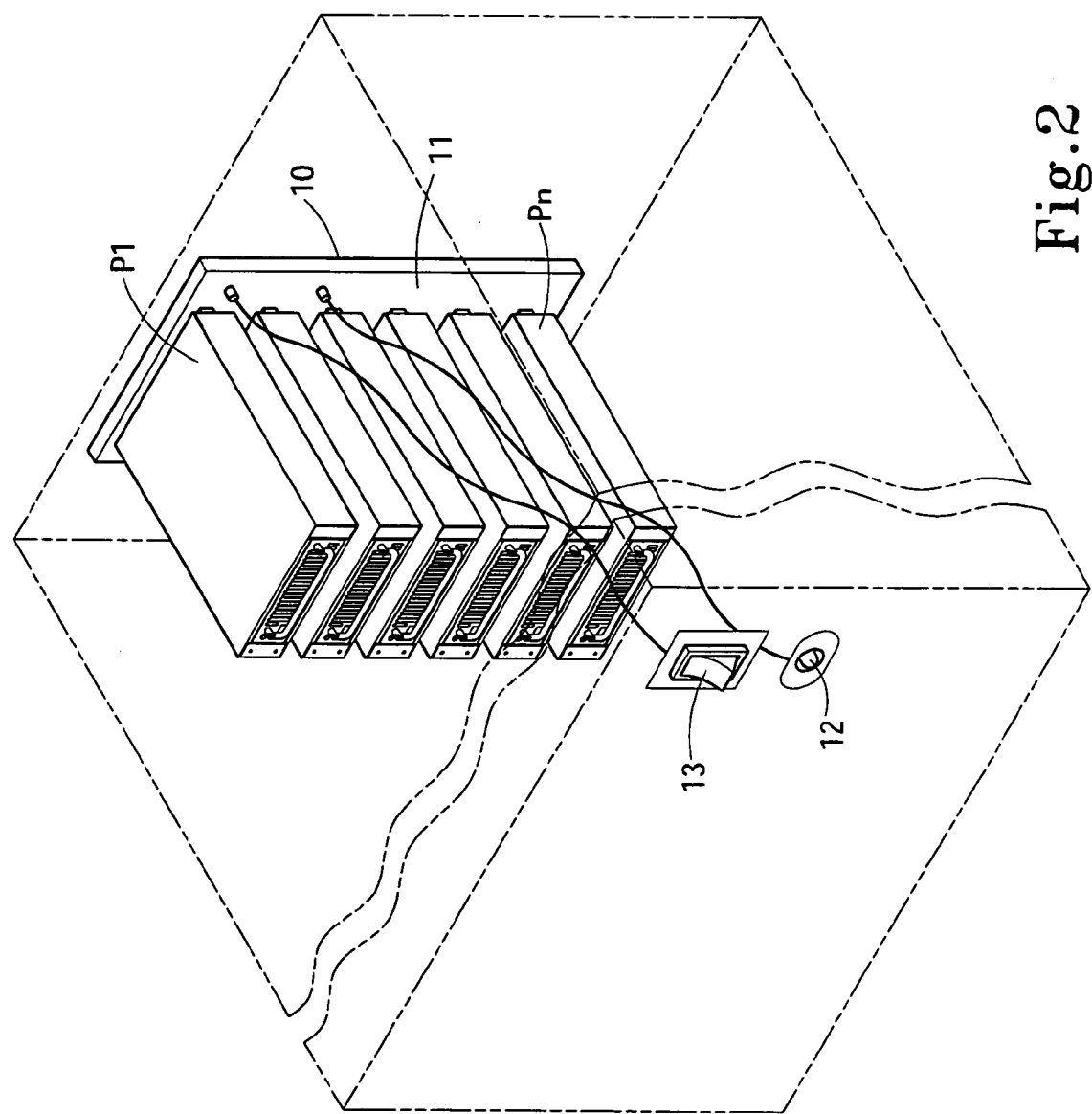
FIG. 2 is a schematic view of the hardware structure of the present invention.
Figure 3:
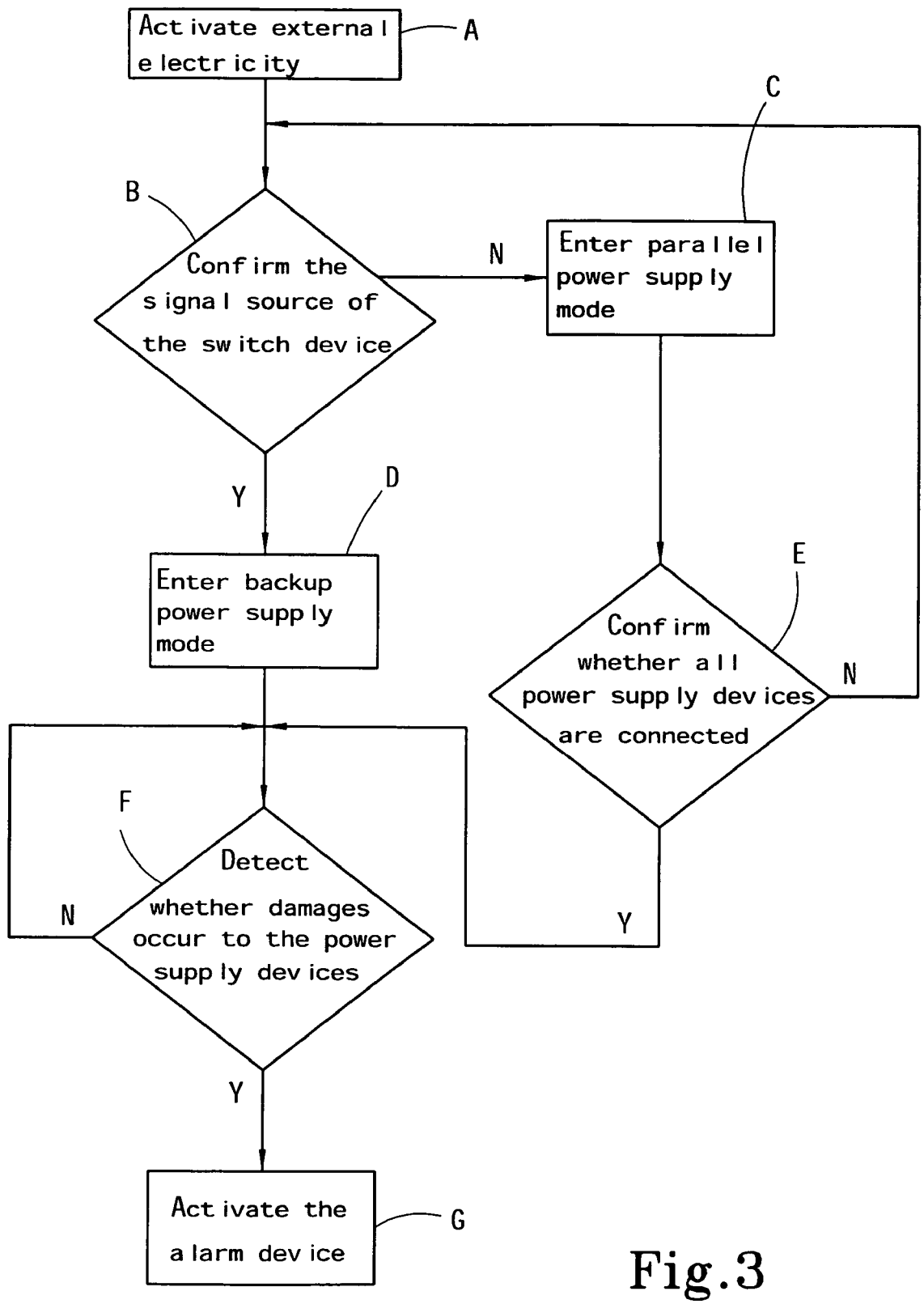
FIG. 3 is a process flow chart of the control method of the present invention.

Referring to FIGS. 1, 2 and 3, the control circuit of the electric output modes according to the present invention mainly is adopted for use on a stacked or juxtaposed power supply system. The power supply system includes a plurality of power supply devices P1, Pn, each connected to an external electricity source 1, and connected to a circuit board 10 for integration before delivering electricity. The circuit board 10 has a control circuit 11 to actuate the power supply devices P1, Pn. In the invention, the control circuit 11 also is connected to a switch device 13 which provides a first signal source and a second signal source corresponding to the parallel power supply mode and the backup power supply mode. The switch device 13 is connected externally and has an activation and a close position to generate a high potential signal and a low potential signal to become the first signal source and the second signal source. The control circuit 11 further is connected to an alarm device 12 to display damage conditions of the power supply devices P1, Pn. The alarm device 12 may be a LED indicator or a buzzer shown in the drawings.

The control method of electric output modes according to the invention includes the steps of:

Activate external electricity (A): Connect the external electricity to the control circuit 11 (AC ON) of the circuit board 10. While the control circuit 11 is activated, the power supply devices P1, Pn are not yet activated.

Determine electric output mode: After the external electricity connecting to the control circuit 11 has been activated, first, confirm the signal source condition (B) of the switch device 13. Depending on the hardware loading requirement at that moment, user can select the parallel power supply mode with a higher integrated power output, or the backup power supply mode that spares one or more of the power supply devices P1, Pn to output power. As the switch device 13 is connected to the external switch, the user can easily operate the switch device 13 to determine the signal source. For the first signal source, enter the parallel power supply mode (C); for the second signal source, enter the backup power supply mode (D).

Confirm whether all power supply devices P1, Pn have been connected (E): In the parallel power supply mode (C), to prevent the power supply devices P1, Pn from abnormal operation such as overloading, the control circuit 11 has to confirm first all the power supply devices P1, Pn have been connected (E). If positive, enter the next step; if negative, the control circuit 11 stops delivering actuation signals and returns to step (B) to confirm signal source condition.

Detect whether damages occur to the power supply devices P1, Pn (F): After having determined the parallel power supply mode or the backup power supply mode to output electricity, the control circuit 11 immediately outputs corresponding actuation signals to drive the power supply devices P1, Pn, and the power supply devices P1, Pn send feedback operation signals to the control circuit 11 which determines whether damages have occurred to the power supply devices P1, Pn; if negative, repeat the detection process; if positive, enter the next step.

Activate the alarm device 12 (G): Once the control circuit 11 receives the operation signals sent by the power supply devices P1, Pn, and determines that damages have occurred to the power supply devices P1, Pn, it sends an alarm signal to the alarm device 12 which displays the damage messages of the power supply devices P1, Pn, and inform users to immediately replace the power supply devices P1, Pn.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A control system of electric output mode for use on a stacked electronic power supply system, said stacked electronic power supply system having a circuit board to integrate a plurality of electronic power supply devices to output electricity, the circuit board comprising:

a control circuit having a parallel power supply mode in which all of said electronic power supply devices are operational and a backup power supply mode in which at least one of said electronic power supply devices is not operational and the remaining electronic power supply devices are operational, and is connected to a user operated switch device external to the stacked power supply system which provides a first signal source and a second signal source corresponding respectively to the parallel power supply mode and the backup power supply mode to allow users to select an actuation signal output from the control circuit to determine whether the control circuit operates in the parallel power supply mode or the backup power supply mode, wherein the first signal source is a high potential signal, and the second signal source is a low potential signal;

said control circuit being connected to an external electricity source initially without providing power to said electronic power supply devices, for selectively providing external electricity to said power supply devices only after a mode of the control circuit is selected by a user and if the parallel power supply is selected, confirming whether all power supply devices are connected;

said control circuit being connected to an alarm device to display physical damage conditions of the power supply devices;

said circuit board integrating an electrical output from said plurality of electronic power supply devices to output electricity.

2. A control method of electric output mode for use on a stacked electronic power supply system, said stacked electronic power supply system having a circuit board to integrate a plurality of electronic power supply devices to output electricity, the circuit board having a control circuit to actuate the electronic power supply devices, the control method comprising the steps of:

activating external electricity to provide power to said control circuit without providing power to said electronic power supply devices;

determining electricity output mode by the control circuit by confirming signal source conditions of a user operated switch device external to the stacked power supply system before generating an actuation signal to connect the external electricity to thereafter enter a parallel power supply mode in which all of said electronic power supply devices are operational when a first signal source is detected, or enter a backup power supply mode in which at least one of said electronic power supply devices is not operational and the remaining electronic power supply devices are operational when a second signal source is detected;

confirming whether all of the power supply devices have been connected in the parallel power supply mode, the control circuit confirming first whether all the power supply devices have been connected and entering the next step if connected or the control circuit stopping sending the actuation signal and returning to the step of determining electricity output mode by confirming signal source conditions of a switch device;

detecting whether physical damage has occurred to the power supply devices after having determined the electricity output mode;

the control circuit sending a corresponding actuation signal to selectively provide external electricity to drive the power supply devices, and the power supply devices sending feedback operation signals to the control circuit which determines whether damages have occurred to the power supply devices;

repeating the detection process when no damage is detected; and activating an alarm device when damage is detected, the control circuit determining damage conditions of the power supply devices according to the operation signals and sending an alarm signal to the alarm device which displays damage messages of the power supply devices and informs users to replace the power supply devices, said circuit board integrating an electrical output from said plurality of electrical supply devices to output electricity, wherein the first signal source is a high potential signal, and the second signal source is a low potential signal.

* * * * *